United States Patent
Hasegawa et al.

(10) Patent No.: US 8,467,360 B2
(45) Date of Patent: Jun. 18, 2013

(54) BASE STATION, WIRELESS COMMUNICATION SYSTEM, AND WIRELESS COMMUNICATION METHOD

(75) Inventors: Noboru Hasegawa, Kawasaki (JP); Takeshi Kunugi, Kawasaki (JP); Reiko Hattori, Kawasaki (JP); Tadashi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 12/849,985

(22) Filed: Aug. 4, 2010

(65) Prior Publication Data

US 2011/0044245 A1 Feb. 24, 2011

(30) Foreign Application Priority Data

Aug. 19, 2009 (JP) .................. 2009-190126

(51) Int. Cl.
*H04W 4/00* (2009.01)
(52) U.S. Cl.
USPC .......................................... 370/338; 370/328
(58) Field of Classification Search
USPC ................... 370/310–350
See application file for complete search history.

(56) References Cited

U.S. PATENT DOCUMENTS

| | | | |
|---|---|---|---|
| 7,519,353 B2 * | 4/2009 | Stevens et al. .................. | 455/407 |
| 2004/0081118 A1 | 4/2004 | Mukherjee et al. | |
| 2004/0162058 A1 | 8/2004 | Mottes | |
| 2008/0137622 A1 * | 6/2008 | Russell .......................... | 370/338 |
| 2009/0022130 A1 * | 1/2009 | Yu et al. ........................ | 370/338 |
| 2009/0154413 A1 | 6/2009 | Kim et al. | |
| 2010/0017861 A1 * | 1/2010 | Krishnaswamy et al. ........ | 726/7 |

FOREIGN PATENT DOCUMENTS

| | | |
|---|---|---|
| JP | 2005-151397 | 6/2005 |
| JP | 2008-118292 | 5/2008 |

OTHER PUBLICATIONS

Extended European Search Report dated Dec. 27, 2010, from the corresponding European Application.

* cited by examiner

*Primary Examiner* — Warner Wong
(74) *Attorney, Agent, or Firm* — Katten Muchin Rosenman LLP

(57) ABSTRACT

A base station includes at least one first application section, a determining section, and a controlling section. Each of the first application sections executes one of a plurality of first application programs corresponding to one of a plurality of first application services utilizing a first wireless communication service provided by a mobile virtual network operator. The determining section receives a connection request to connect to the first application service from a first terminal for using the first wireless communication service, and determines the first application section corresponding to the first application service specified in the connection request. The controlling section controls communications between the determined first application section and a server managed by the mobile virtual network operator and between the determined first application section and the first terminal.

15 Claims, 13 Drawing Sheets

| OPERATOR ID | APPLICATION No. | PROCESS ID |
|---|---|---|
| 0001 | 1 | FE95D0 |
| 0002 | 2 | AB63E0 |
| 0003 | 3 | BBC540 |
| 0004 | 4 | 9B24C0 |
| 0005 | 5 | DEC230 |

BASE STATION, WIRELESS COMMUNICATION SYSTEM, AND WIRELESS COMMUNICATION METHOD

CROSS-REFERENCE TO RELATED APPLICATION

This application is based upon and claims the benefit of priority of the prior Japanese Patent Application No. 2009-190126, filed on Aug. 19, 2009, the entire contents of which are incorporated herein by reference.

FIELD

The embodiments discussed herein are related to a base station, a wireless communication system, and a wireless communication method.

BACKGROUND

A mobile virtual network operator (hereinafter referred to as MVNO) has been known as one of operators that provide mobile communication services. The MVNO provides mobile communication services by leasing a mobile network from a mobile network operator (hereinafter referred to as MNO) that owns a physical mobile network.

There is a known relay base station apparatus that is connected to a connection control server of a connection operator carrying out connection to a public network and that relays the connection between a user terminal and the connection control server in response to a request for connection to the public network through wireless communication from the user terminal. For example, the relay base station apparatus determines whether a connection operator identification code included in connection request data matches an identification code of an own connection operator. When the relay base station apparatus has determined that both the identification codes match each other, the relay base station apparatus relays the connection between the user terminal and the connection control server connected to the own relay base station apparatus, thereby establishing a connection path. When the relay base station apparatus determines that both the identification codes do not math each other, the relay base station apparatus transmits the connection request data received from the user terminal to another relay base station apparatus in accordance with address data of connection destinations stored in advance. Japanese Laid-open Patent Publication No. 2005-151397 discloses a related technique.

There is a known communication method in which a pool of one or more affiliate nodes is formed and a wireless base station transfers a control signal between a mobile apparatus and an affiliate node. For example, upon receiving a control message from the mobile apparatus, the wireless base station determines whether the wireless base station is connected to plural pools with an overlap. When the wireless base station is connected to plural pools with an overlap, the wireless base station extracts a pool identifier from the control message and determines whether the pool identifier corresponds to one of the plural pools to which the wireless base station is connected. When the pool identifier corresponds to one of the plural pools to which the wireless base station is connected or when the wireless base station is not connected to plural pools with an overlap, the wireless base station transfers a control signal included in the control message in accordance with an affiliate node identifier included in the control message. Also, a multi-operator core network (MOCN) has been known, in which one wireless network is controlled a plurality of core network operators. Japanese Laid-open Patent Publication No. 2008-118292 discloses a related technique.

SUMMARY

A base station according to an aspect of the present invention includes at least one first application section, a determining section, and a controlling section.

Each of the first application sections executes one of a plurality of first application programs corresponding to one of a plurality of first application services utilizing a first wireless communication service provided by a mobile virtual network operator.

The determining section receives a connection request to connect to the first application service from a first terminal for using the first wireless communication service, and determines a first application section corresponding to the first application service specified in the connection request.

The controlling section controls communications between the determined first application section and a server managed by the mobile virtual network operator and between the determined first application section and the first terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of correspondence between identification information and application sections according to an embodiment of the present invention;

DESCRIPTION OF EMBODIMENTS

Figure 1:
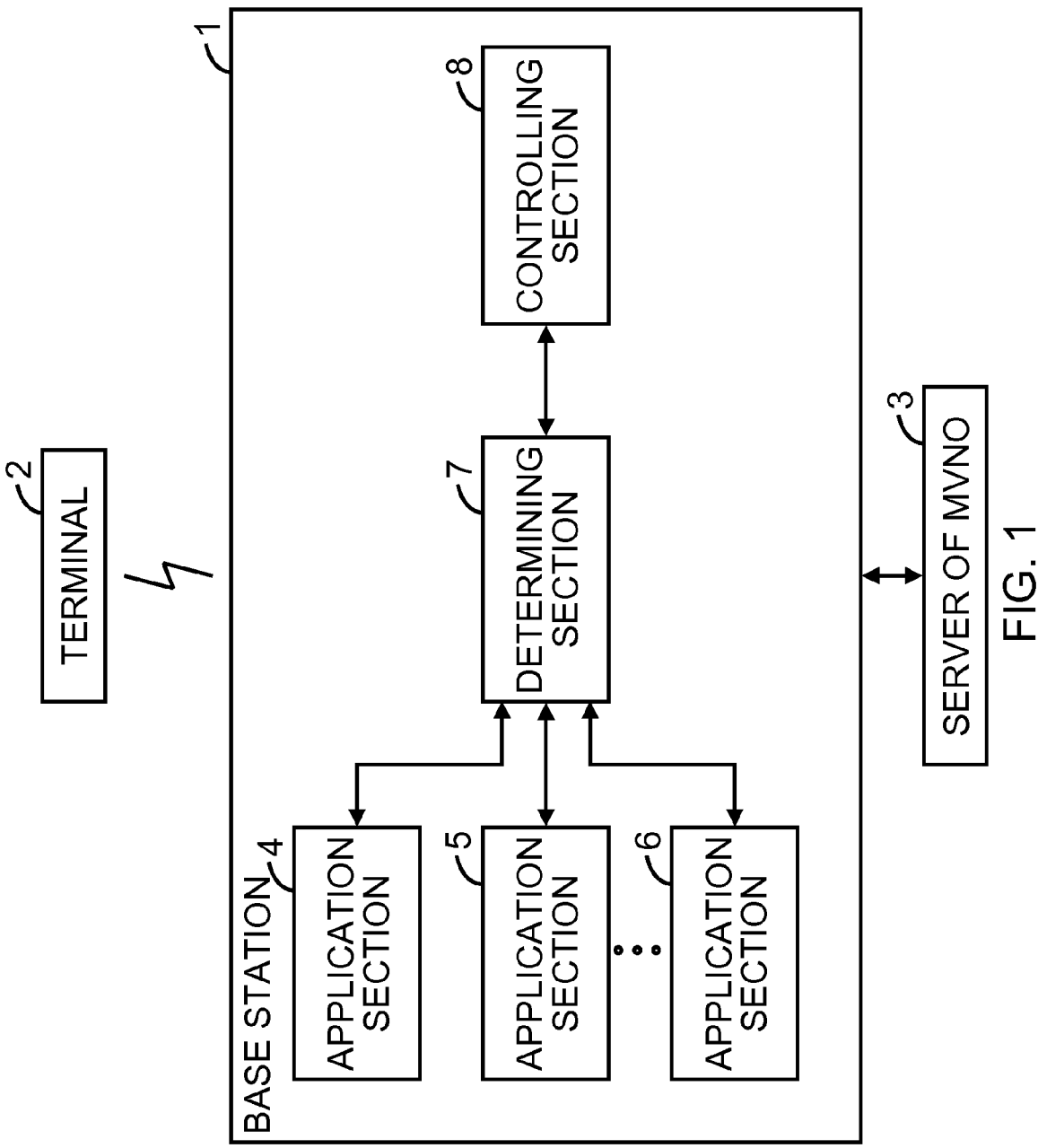
FIG. 1 is a diagram illustrating an example of a configuration of a wireless communication system according to an embodiment of the present invention.

Conventionally, a base station of an MNO receives a request for connection to a service provided using a wireless communication service of an MVNO, from a terminal of a user (hereinafter referred to as an MVNO service user) who uses the service. The MVNO does not own an apparatus that holds application programs corresponding to various services provided by a provider (hereafter referred to as an MVNO service provider) that provides services using a wireless communication service of the MVNO and a function of determining whether to connect to each service. For this reason, the terminal of the MVNO service user communicates with a server of the MVNO via an apparatus of the MNO that holds application programs corresponding to various services and a function of determining whether to connect to each service. After that, the MVNO service user may use a service of the MVNO service provider by using the wireless communication service of the MVNO. Therefore, the wireless communication service of the MVNO may be limited by the wireless communication service of the MNO, which causes problems in that the wireless communication service unique to the MVNO may not be provided and that the services provided by the MVNO service provider are limited. Also, the MVNO leases, from the MNO, a base station, an apparatus that holds application programs corresponding to various services and a function of determining whether to connect to each service, facilities between the base station and the apparatus, and facilities between the apparatus and the server of the MVNO. This causes a problem of increasing the cost of a wireless communication service provided by the MVNO and the cost of a service provided by the MVNO service provider. Furthermore, the existing facilities of the MNO are incapable of handling an increase in users of the wireless communication service of the MVNO. This causes the necessity for increasing the facilities of the MNO, which increases the burden of the MNO disadvantageously.

On the other hand, when the MVNO owns an apparatus that holds application programs corresponding to various services of the MVNO and a function of determining whether to connect to each service, the terminal of the MVNO service user communicates with the server of the MVNO via the apparatus of the MVNO. In this case, the above-discussed problems about the degree of freedom of services and the cost of providing services may be addressed. In this case, however, the MVNO prepares the apparatus that holds application programs corresponding to various services of the MVNO and a function of determining whether to connect to each service. This causes an increase in burden of facility investment and maintenance of the apparatus, which disadvantageously makes it difficult to enter the mobile virtual network business.

According to the embodiments of the present invention, greater flexibility in mobile virtual network business may be allowed. For example, an MVNO or an MVNO service provider may freely and inexpensively provide services, an MNO leasing a mobile network to an MVNO may reduce its own burden, and easier entry into the mobile virtual network business may be allowed.

Hereinafter, embodiments of the present invention will be discussed in detail with reference to the attached drawings.

First Embodiment

FIG. 1 illustrates an example of a configuration of a wireless communication system according to the present embodiment. As illustrated in FIG. 1, the wireless communication system includes a base station 1, a terminal 2 of an MVNO service user, and a server 3 managed by the MVNO. The base station 1 includes one or more application sections 4, 5, and 6, the amount of which is n, a determining section 7, and a controlling section 8. Each of the application sections 4, 5, and 6 holds an application program corresponding to a service provided by an MVNO service provider. The determining section 7 receives a request (referred to as a connection request) for connection to a service of the MVNO service provider from the terminal 2 of the MVNO service user. The determining section 7 determines an application section corresponding to the connection request from among the application sections 4, 5, and 6 registered therein. The controlling section 8 controls communication between the application section determined by the determining section 7 and the server 3 of the MVNO. The controlling section 8 controls communication with the terminal 2 of the MVNO service user.

Figure 2:
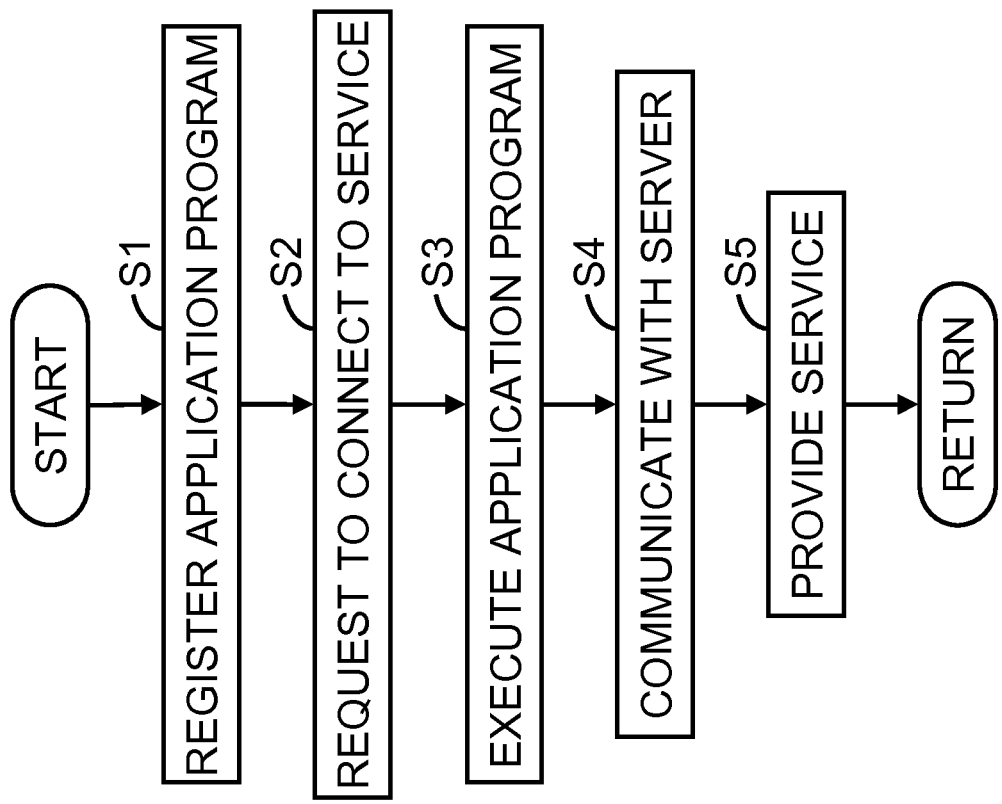
FIG. 2 is a diagram illustrating an example of an operation flow of a wireless communication method according to an embodiment of the present invention.

FIG. 2 illustrates an example of an operation flow of a wireless communication method according to the present embodiment.

In operation S1, application programs corresponding to services of the MVNO service provider are installed into and registered in the base station.

In operation S2, the MVNO service user requests to connect to a service of the MVNO service provider from the terminal of the MVNO service user to the base station.

In operation S3, the base station receives the connection request from the terminal of the MVNO service user, determines an application program corresponding to the connection request, and executes the determined application program.

In operation S4, the application section executing the determined application program accesses the server of the MVNO to communicate with the server of the MVNO.

In operation S5, the application section provides the service corresponding to the application program executed in response to the connection request to the terminal of the MVNO service user, from which the connection to the service of the MVNO service provider has been requested.

According to the first embodiment, application programs corresponding to services provided by the MVNO service provider are registered in the base station, and an application section executing the application program communicates with the server of the MVNO. Accordingly, the terminal of the MVNO service user and the server of the MVNO may communicate with each other without passing through an apparatus managed by an MNO, which holds application programs corresponding to various services and a function of determining whether to connect to each service. That is, a service provider of the MVNO or MNO may freely provide services without being limited by a wireless communication service of the MNO. The MVNO does not need to lease from the MNO the apparatus that holds application programs corresponding to various services and a function of determining whether to connect to each service. Thus, the MVNO and the MVNO service provider may provide a service at low cost. The MVNO does not use the apparatus of the MNO, which holds application programs corresponding to various services and a function of determining whether to connect to each service. Thus, the load of the MNO is reduced compared to the case where the MVNO uses the apparatus. Accordingly, the burden of the MNO may be reduced. The base station holds application programs corresponding to various services of the MVNO and determines whether to connect to each service. Thus, the MVNO does not need to own an apparatus that holds application programs corresponding to various services and a function of determining whether to connect to each service. Therefore, the initial facility investment of the MVNO may be decreased, so that entry into the mobile virtual network business may be easily realized.

Second Embodiment

Figure 3:
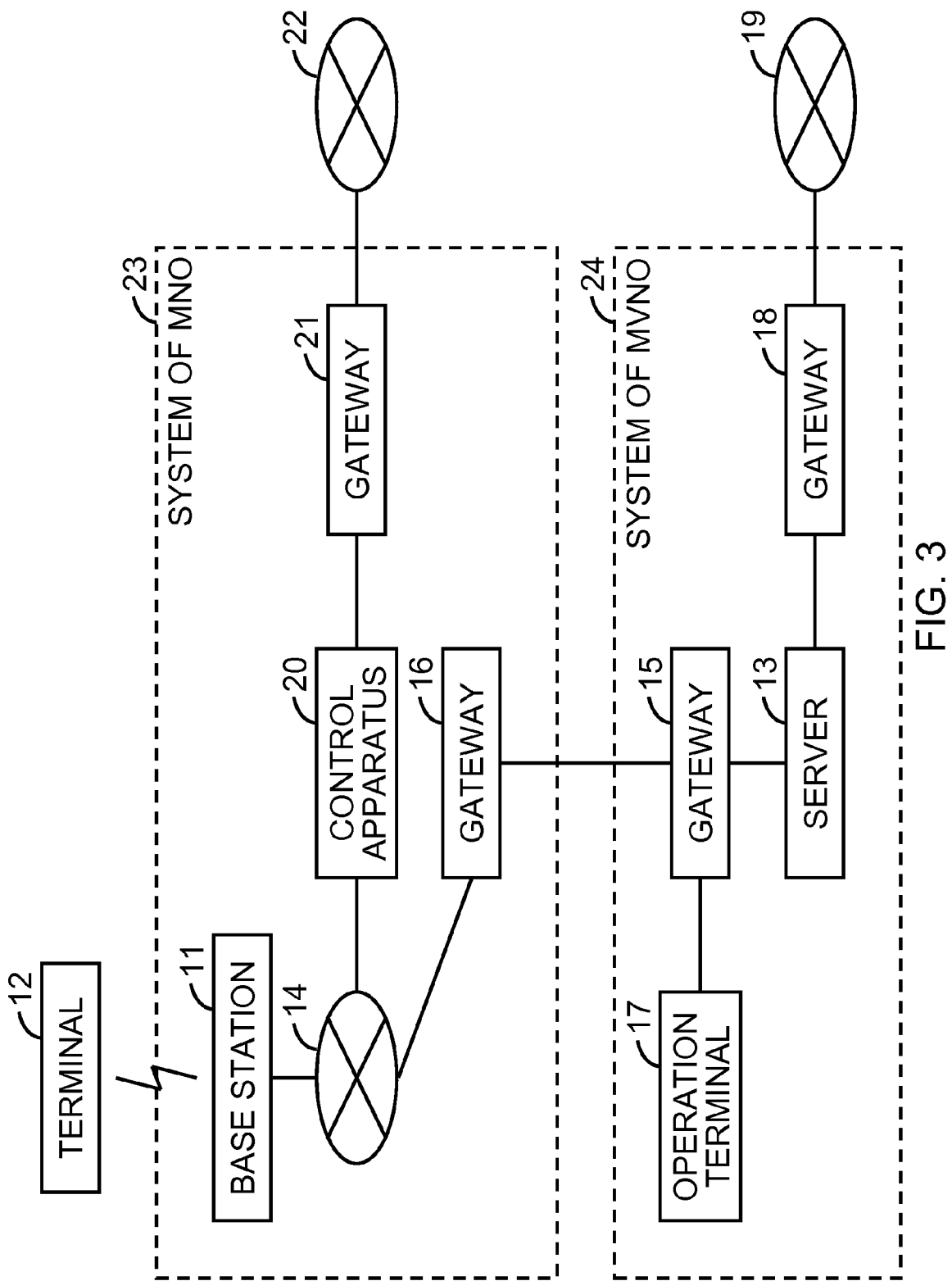
FIG. 3 is a diagram illustrating an example of an entire configuration of a wireless communication system according to an embodiment of the present invention.

FIG. 3 illustrates an example of an entire configuration of a wireless communication system according to the present embodiment. As illustrated in FIG. 3, the wireless communication system includes a base station 11, a terminal 12 of an MVNO service user, and a server 13 of the MVNO. The base station 11 is connected to a network 14 in an MNO, for example. The server 13 of the MVNO is connected to the network 14 in the MNO via a gateway 15 in the MVNO and a gateway 16 in the MNO, for example. An operation terminal 17 of the MVNO is connected to the gateway 15 in the MVNO or the server 13 of the MVNO. The server 13 of the MVNO is connected to a network 19 outside the MVNO via a gateway 18 in the MVNO.

A control apparatus 20 is connected to the network 14 in the MNO. The control apparatus 20 is an apparatus that holds application programs corresponding to various services of the MNO and a function of determining whether to connect to each service. An example of the control apparatus 20 is a mobility management entity (MME, also referred to as a mobility control node). Apparatuses such as an MME and a switch for mobile communication may be called core network nodes or core nodes. The control apparatus 20 is connected to a network 22 outside the MNO via a gateway 21 in the MNO. The base station 11 and the control apparatus 20 are included in a wireless communication system 23 of the MNO. The server 13 of the MVNO and the operation terminal 17 of the MVNO are included in a wireless communication system 24 of the MVNO. Alternatively, the wireless communication system may include a terminal of a user who uses the wireless communication service of the MNO.

The base station 11 holds application programs corresponding to various services of the MVNO, for example. The base station 11 determines whether to connect to each service of the MVNO. That is, the base station 11 may be thought as having an apparatus, with respect to the wireless communication system 24 of the MVNO, equivalent to the control apparatus 20 in the wireless communication system 23 of the MNO. When an application program corresponding to one of the various services of the MVNO is executed in the base station 11, an application section executing the application program communicates with the server 13 of the MVNO without passing through the control apparatus 20. Hereinafter, a specific configuration of the base station 11 will be discussed.

Figure 4:
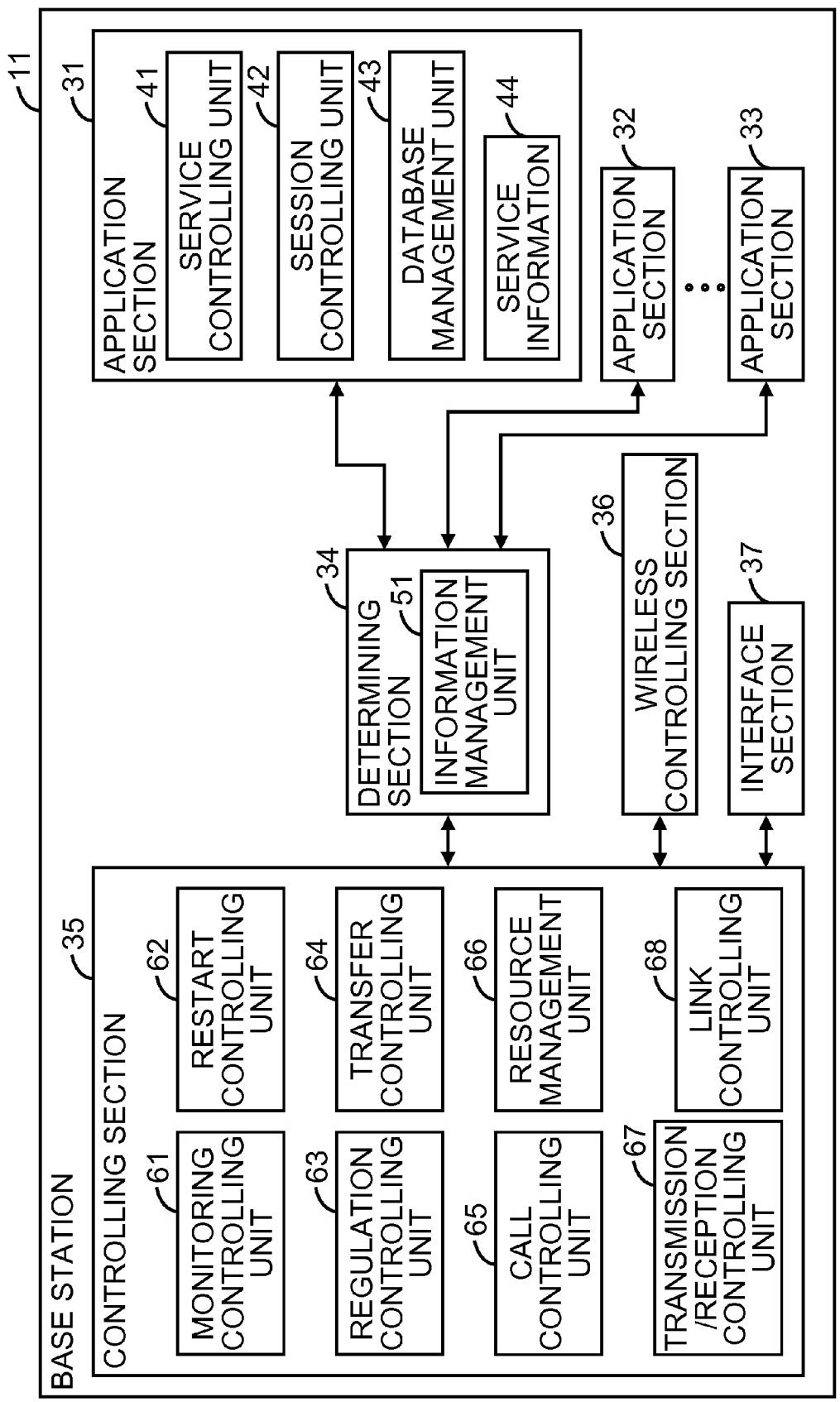
FIG. 4 is a diagram illustrating an example of a configuration of a base station according to an embodiment of the present invention.

FIG. 4 illustrates an example of a configuration of the base station 11 according to the present embodiment. As illustrated in FIG. 4, the base station 11 includes one or more application sections 31, 32, and 33, a determining section 34, a controlling section 35, a wireless controlling section 36, and an interface section 37. The application section 31 holds an application program corresponding to a service of the MVNO service provider. The application section 31 may include a service controlling unit 41, a session controlling unit 42, a database management unit 43, and service information 44.

The service controlling unit 41 determines whether a terminal that has requested connection to a service is the terminal of the user of the service in accordance with the content of a received signal, and determines whether to provide the service to the terminal. The service controlling unit 41 determines the type of service information in accordance with the content of the request for connection to the service and transmits service information to the user of the service via the database management unit 43. The service controlling unit 41 may control an apparatus on a network side by transmitting a control signal to the server 13 of the MVNO. The session controlling unit 42 analyzes a control signal for communication between the server 13 of the MVNO and an application section, and generates the control signal. The session controlling unit 42 manages a sequence. The database management unit 43 selects information, which has been specified by the service controlling unit 41, from the service information 44 and sends the selected information to the controlling section 35. Upon receiving a request for updating service data, the database management unit 43 overwrites the service information 44 with new service data or adds new service data to the service information 44. The service information 44 is data that is used by an application section. The application section 32 and the application section 33 are similar to the application section 31. The amount of application sections is n. Here, "n" is a natural number, and the base station 11 may include only one or two application sections.

The determining section 34 extracts identification information from a received signal. The determining section 34 determines an application section in accordance with the identification information. Examples of the identification information include information about the type of terminal, information about an identification (ID) of an operator, and information about the number of an application service. The determining section 34 may hold information about the correspondence between identification information and application sections. In accordance with the information about the correspondence between identification information and application sections, the determining section 34 transmits the received signal to the corresponding application section. The determining section 34 may include an information management unit 51 that manages information about the correspondence between identification information and application sections. FIG. 5 illustrates an example of the correspondence between identification information and application sections. In the example illustrated in FIG. 5, the relationships among the IDs of operators, the numbers of application services, and the IDs of processes are illustrated in a table 52 that indicates the correspondence between identification information and application sections. The ID of a process is an identification number of a program.

The controlling section 35 controls communication between the application section determined by the determining section 34 and the server 13 of the MVNO. The controlling section 35 controls communication with the terminal 12 of the MVNO service user. The controlling section 35 may include a monitoring controlling unit 61, a restart controlling unit 62, a regulation controlling unit 63, a transfer controlling unit 64, a call controlling unit 65, a resource management unit 66, a transmission/reception controlling unit 67, and a link controlling unit 68.

The monitoring controlling unit 61 monitors and controls individual devices provided in the base station 11. The monitoring controlling unit 61 monitors and controls operations in respective processes of the application sections 31, 32, and 33, the determining section 34, and the controlling section 35. The restart controlling unit 62 controls the startup of the application sections 31, 32, and 33, the determining section 34, and the controlling section 35 at the startup of the base station 11. The restart controlling unit 62 controls the application sections 31, 32, and 33, the determining section 34, and the controlling section 35 when the application programs are installed in the application sections 31, 32, and 33. Upon completing the startup, the restart controlling unit 62 instructs the link controlling unit 68 to establish a connection with an opposite node in an inter-office link. The regulation controlling unit 63 performs control to regulate communication between the terminal 12 of the MVNO service user and the base station 11 or between the terminal 12 of the MVNO service user and the server 13 of the MVNO in response to requests from the application sections 31, 32, and 33 when control of a traffic volume is needed due to circumstances such as congestion of traffic and maintenance, or in accordance with a preset condition of regulation.

For example, the application sections 31, 32, and 33 regularly communicate with the server 13 of the MVNO and recognize the load status of the server 13 of the MVNO or the network. When the load is high, the application sections 31, 32, and 33 determine that the traffic is in a congestion state, and instruct the regulation controlling unit 63 to regulate communications. The application sections 31, 32, and 33 know the amount of users who are using the service provided thereby, and thus may instruct the regulation controlling unit 63 to regulate communication when the amount of users who are using the service provided thereby is a predetermined amount or more. The regulation controlling unit 63 regulates communication between the base station 11 and the terminal 12 of the MVNO service user or between the server 13 of the MVNO and the terminal 12 of the MVNO service user. Thus, the load of the base station 11, the server 13 of the MVNO, or the network may be reduced.

The transfer controlling unit 64 manages an operation of updating a file when the software of the application sections 31, 32, and 33 and the controlling section 35, the data about the base station 11, or the service information 44 used by the application sections 31, 32, and 33 is updated. The transfer controlling unit 64 operates in the case of uploading various data or logs stored in the base station 11. The call controlling unit 65 controls a connection sequence when connection of a call is established in response to an instruction from the terminal 12 of the MVNO service user, the terminal of the user who uses an MNO wireless communication service, or an apparatus on a network side, after connection of inter-office link has been established.

The resource management unit 66 acquires or releases the resources specified by an application section or the call controlling unit 65 when call control is performed. The transmission/reception controlling unit 67 controls transmission/reception of a control signal to/from the terminal 12 of the MVNO service user, the terminal of a user who uses a wireless communication service of the MNO, the server 13 of the MVNO, or an apparatus or communication terminal on the network connected via the server 13 of the MVNO. The link controlling unit 68 controls an operation of connecting an inter-office link with an opposite node when the connection is requested by the application section 31, 32, or 33. The determining section 34 and the controlling section 35 may be collectively called a platform. The determining section 34 and the controlling section 35 may be realized when a processor (not illustrated) of the base station 11 executes corresponding software.

The wireless controlling section 36 controls wireless communication via an antenna (not illustrated) between the terminal 12 of the MVNO service user and the base station 11 or between the terminal of a user who uses a wireless communication service of the MNO and the base station 11. The interface section 37 is an interface for a network, such as the network 14 in the MNO. The base station 11 may hold an application program corresponding to a service of a provider who provides the service using a wireless communication service of the MNO. For example, in FIG. 4, the application section 33 may hold an application program corresponding to a service of a provider who provides the service using a wireless communication service of the MNO. In this case, the determining section 34 may determine and execute the application program corresponding to the service of the provider who provides the service using the wireless communication service of the MNO in response to a request for connection to the service. The controlling section 35 may perform control on the application section corresponding to the service of the provider who provides the service using the wireless communication service of the MNO in the same manner as in control on the application section corresponding to the service of the MVNO service provider.

The entire operation flow of the wireless communication method according to the second embodiment is similar to the operation flow of the wireless communication method according to the first embodiment illustrated in FIG. 2. Hereinafter, discussions will be given about a procedure of registering an application program, a procedure of registering service information, and a procedure of determining an application section in the base station performed when calling.

Figure 6:
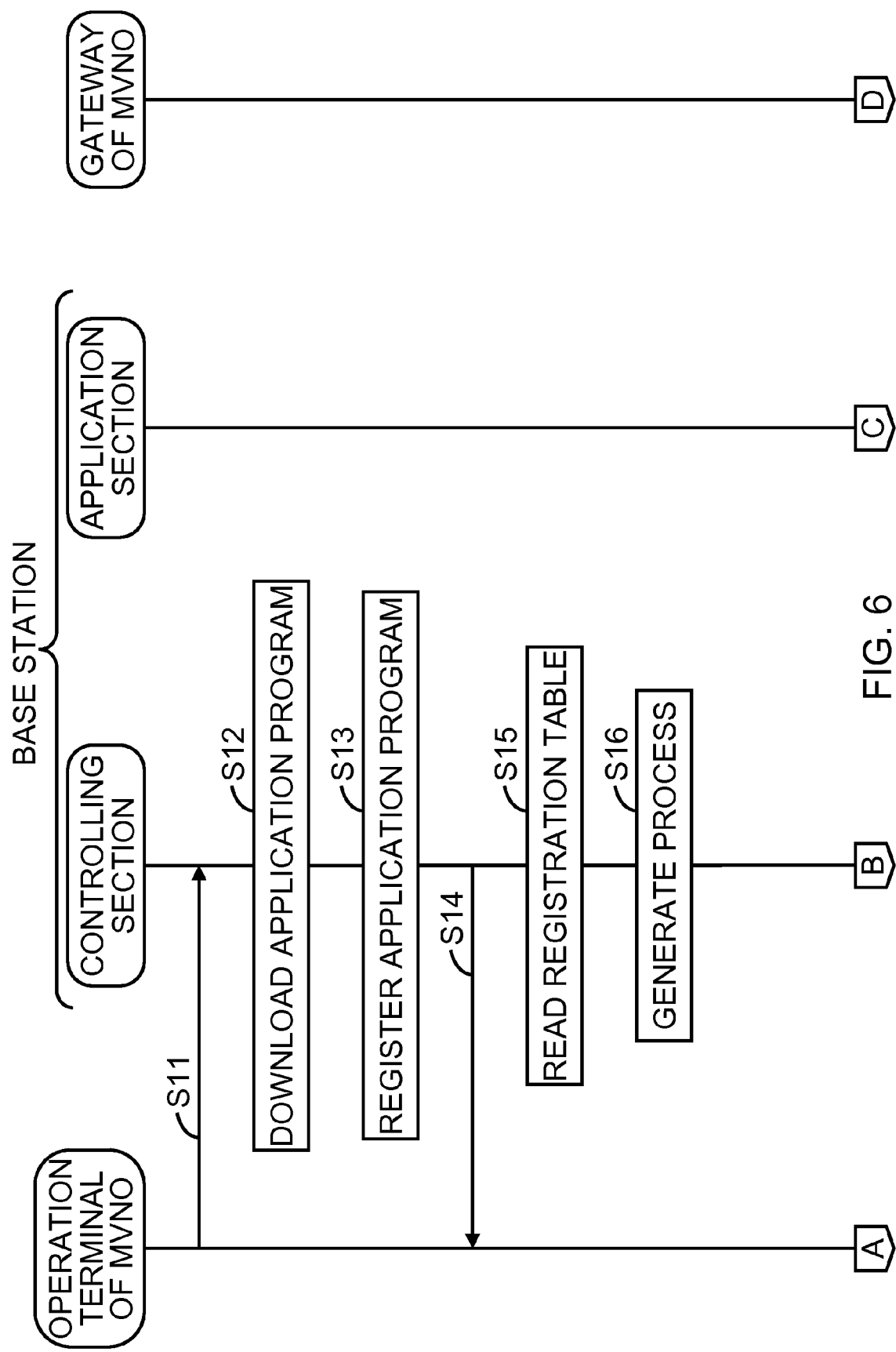
FIG. 6 is a diagram illustrating an example of a sequence of operations for registering an application program according to an embodiment of the present invention.
Figure 7:
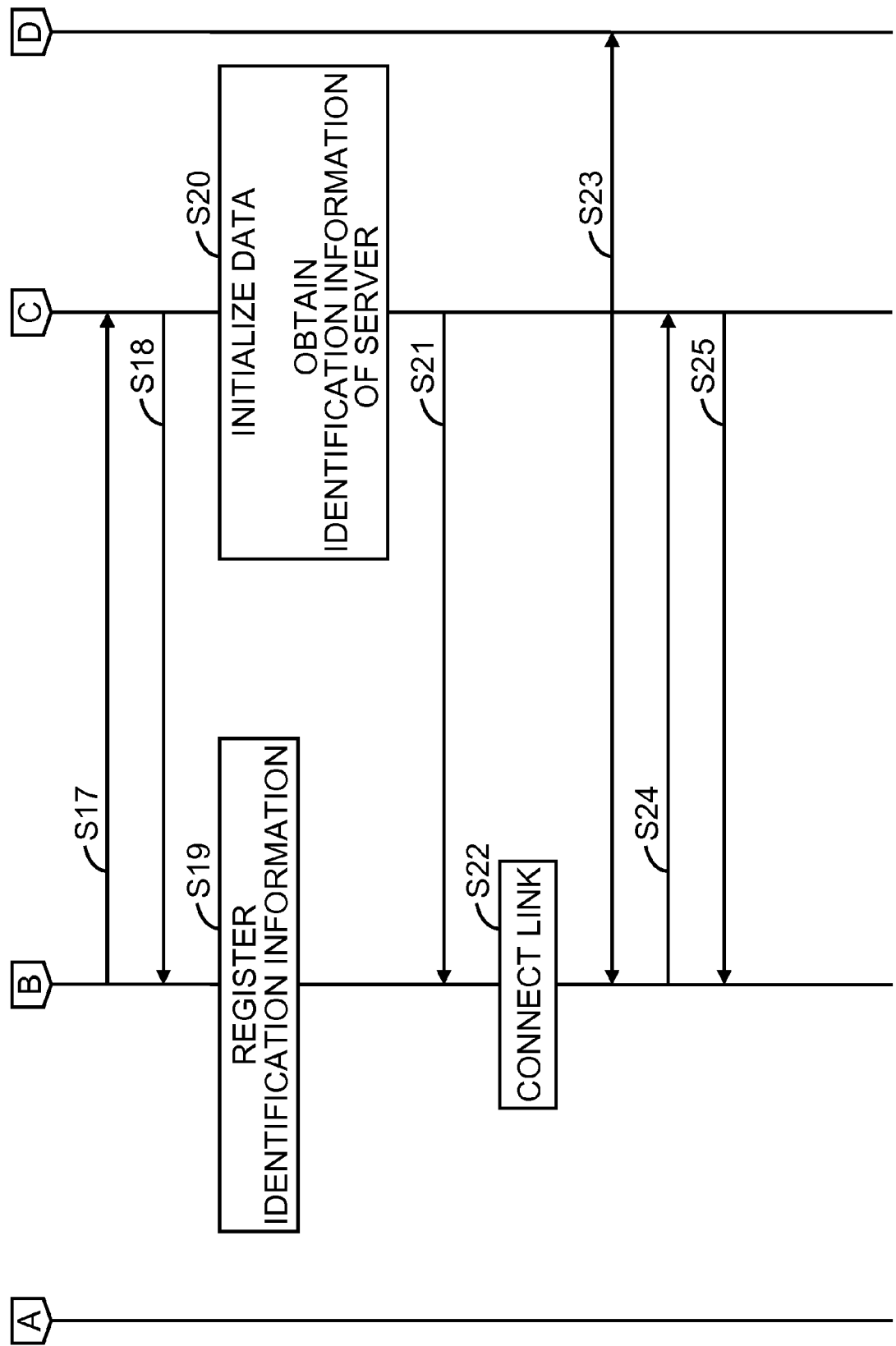
FIG. 7 is a diagram illustrating an example of a sequence of operations for registering an application program according to an embodiment of the present invention.

FIGS. 6 and 7 illustrate an example of a sequence of operations for registering an application program according to the present embodiment. Here, a discussion will be given about the case of registering an application program of a service provider in the application section 31.

In operation S11, the operation terminal 17 of the MVNO instructs the controlling section 35 of the base station 11 to install an application program.

In operation S12, the controlling section 35 downloads the application program of the service provider from the server 13 of the MVNO. The application program of the service provider has been generated in advance by the MVNO in accordance with a contract between the service provider and the MVNO or in accordance with required specifications of the service provider, for example, and has been stored in the server 13 of the MVNO.

In operation S13, the controlling section 35 registers the downloaded application program in a registration table of application programs stored in the base station 11.

In operation S14, upon completing the installation, the controlling section 35 notifies the operation terminal 17 of the MVNO that the installation has been completed.

In operation S15, the controlling section 35 reads the registration table of application programs.

In operation S16, the controlling section 35 generates a process of the application section.

In operation S17, the controlling section 35 instructs the application section 31 to execute the application program to restart it.

In operation S18, the application section 31 instructs the controlling section 35 to acquire a memory to be used.

In operation S19, the controlling section 35 registers identification information, such as the ID of an operator and the number of the application service, in the determining section 34.

In operation S20, the application section 31 initializes data and obtains identification information of the server 13 of the MVNO. An example of the identification information of the server 13 of the MVNO is an internet protocol (IP) address of the server 13 of the MVNO.

In operation S21, the application section 31 requests the controlling section 35 to establish an inter-office control link. An example of the inter-office control link is a stream control transmission protocol (SCTP) link.

In operation S22, the controlling section 35 performs connection of the inter-office control link.

In operation S23, the inter-office control link is established between the controlling section 35 and the gateway 15 in the MVNO.

In operation S24, the controlling section 35 transmits, to the application section 31, a response to the request for establishment of the inter-office control link.

In operation S25, the application section 31 notifies the controlling section 35 that the restart of the application program has been completed. Thereafter, normal operations are performed, and the controlling section 35 monitors the process of the application section.

Figure 8:
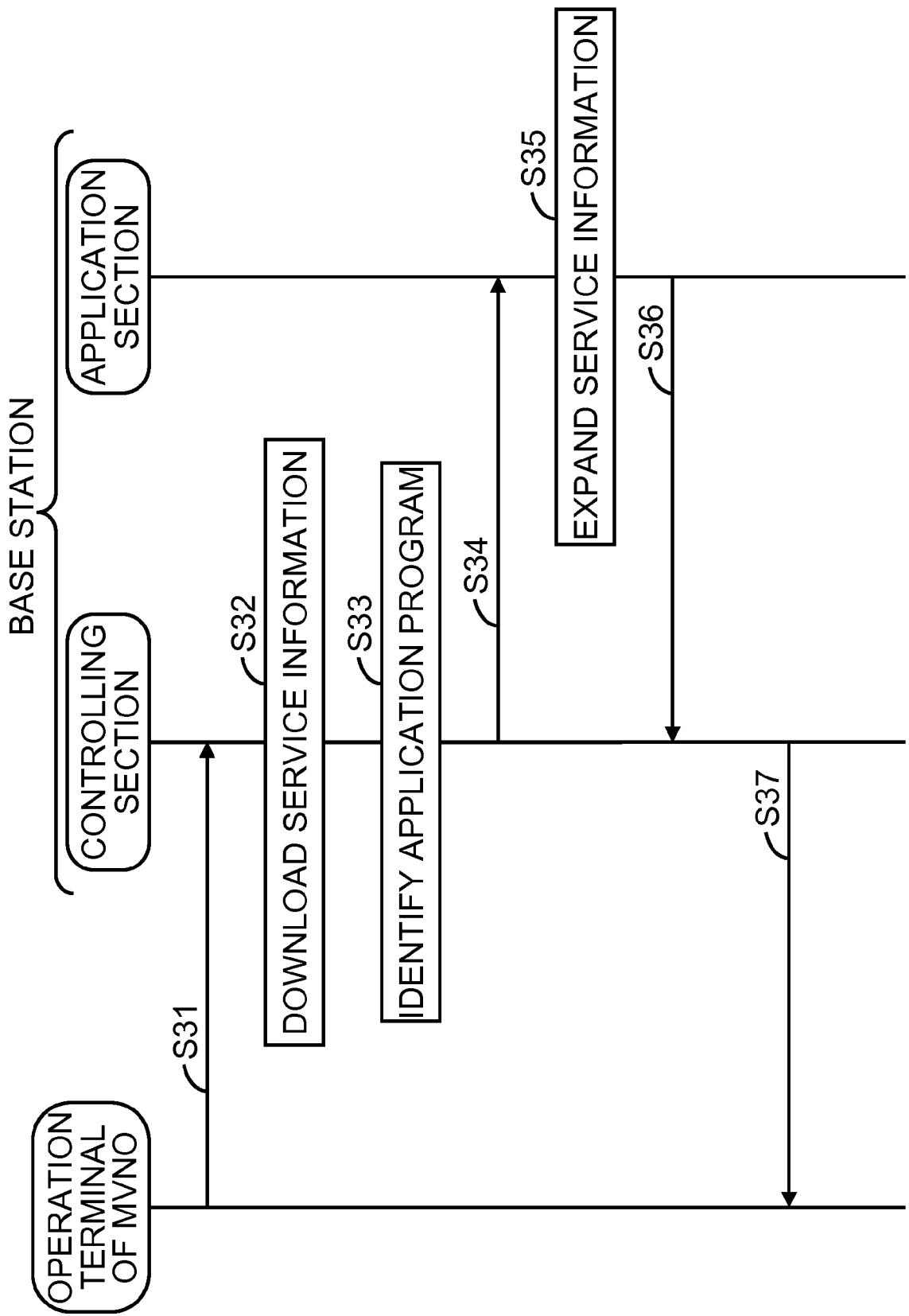
FIG. 8 is a diagram illustrating an example of a sequence of operations for registering service information according to an embodiment of the present invention.

FIG. 8 illustrates a first example of a sequence of operations for registering service information according to the present embodiment. Here, a discussion will be given about the case of registering service information in the application section 31 (this is the same in the following second and third examples).

In operation S31, the operation terminal 17 of the MVNO specifies an application service and instructs the controlling section 35 of each base station 11 to register service information.

In operation S32, the controlling section 35 of each base station 11 downloads the service information from the server 13 of the MVNO. The service information has been transmitted in advance from a service provider to the server 13 of the MVNO, for example.

In operation S33, the controlling section 35 of each base station 11 identifies the application program in accordance with identification information included in the service information, such as the ID of an operator and the number of the application service.

In operation S34, in each base station 11, the controlling section 35 sends the service information to the application section 31 in which the identified application program has been registered.

In operation S35, the application section 31 of each base station 11 expands the service information in the memory acquired for the application section 31.

In operation S36, in each base station 11, the application section 31 notifies the controlling section 35 that registration of the service information has been completed.

In operation S37, the controlling section 35 of each base station 11 notifies the operation terminal 17 of the MVNO that registration of the service information has been completed.

Figure 9:
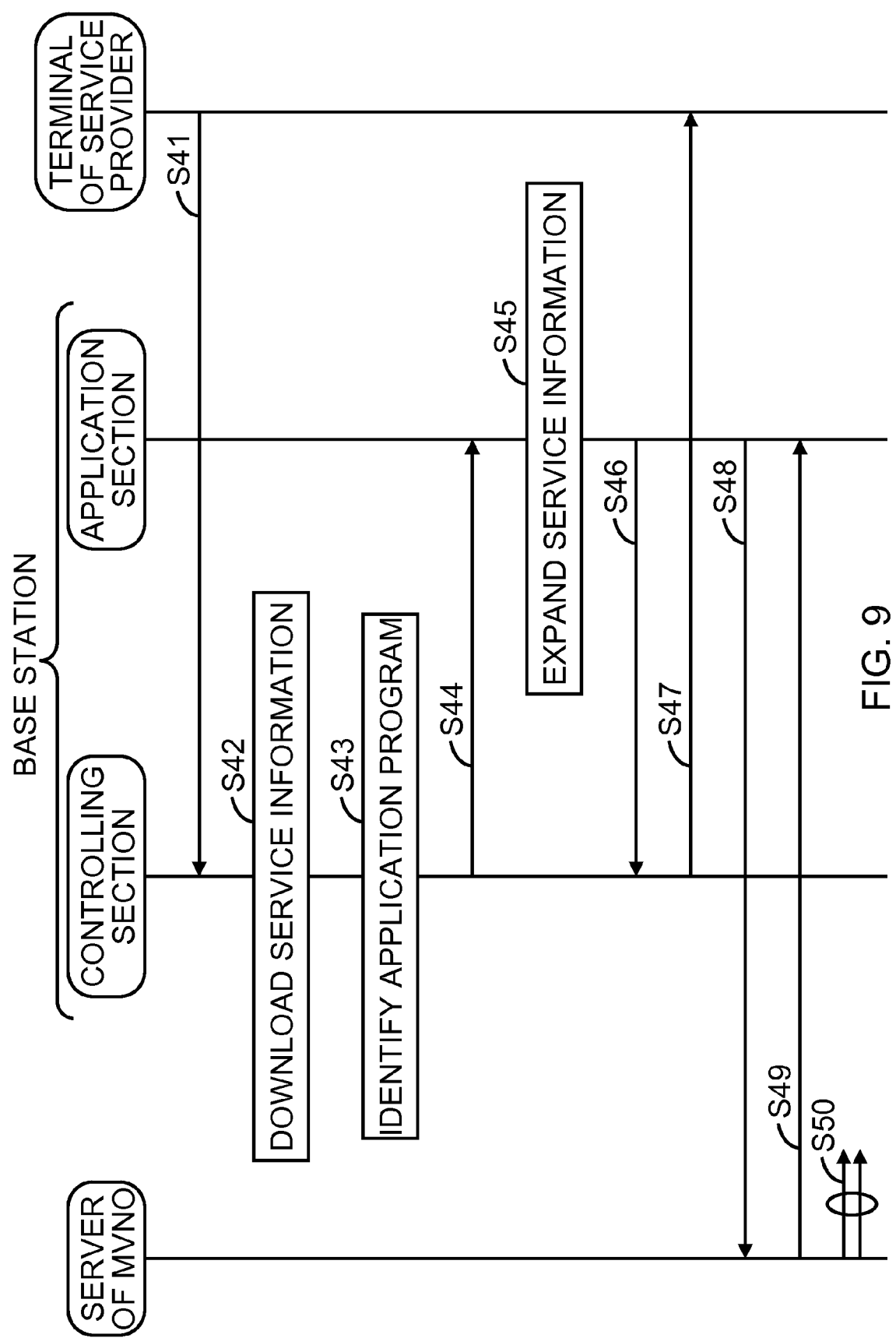
FIG. 9 is a diagram illustrating an example of a sequence of operations for registering service information according to an embodiment of the present invention.

FIG. 9 illustrates a second example of a sequence of operations for registering service information according to the present embodiment.

In operation S41, a terminal, such as a mobile terminal, of a service provider instructs the nearest base station 11 to register service information by specifying an application service.

In operation S42, the controlling section 35 of the nearest base station 11 downloads the service information from the terminal, such as a mobile terminal, of the service provider.

In operation S43, the controlling section 35 of the nearest base station 11 identifies the application program in accordance with identification information included in the service information, such as the ID of an operator and the number of the application service.

In operation S44, in the nearest base station 11, the controlling section 35 sends the service information to the application section 31 in which the identified application program has been registered.

In operation S45, the application section 31 of the nearest base station 11 expands the service information in the memory acquired for the application section 31.

In operation S46, in the nearest base station 11, the application section 31 notifies the controlling section 35 that registration of the service information has been completed.

In operation S47, the controlling section 35 of the nearest base station 11 notifies the terminal, such as a mobile terminal, of the service provider that registration of the service information has been completed.

In operation S48, the application section 31 of the nearest base station 11 transfers the service information to the server 13 of the MVNO and notifies the server 13 of the registration of the service information.

In operation S49, the server 13 of the MVNO registers the service information transferred thereto, and notifies the application section 31 of the transfer source (the nearest base station 11) of the service information that registration of the service information has been completed.

In operation S50, the server 13 of the MVNO transfers the service information to base stations other than the nearest base station 11 and notifies the base stations of the registration of the service information. The base stations that have received the service information register the service information.

Figure 10:
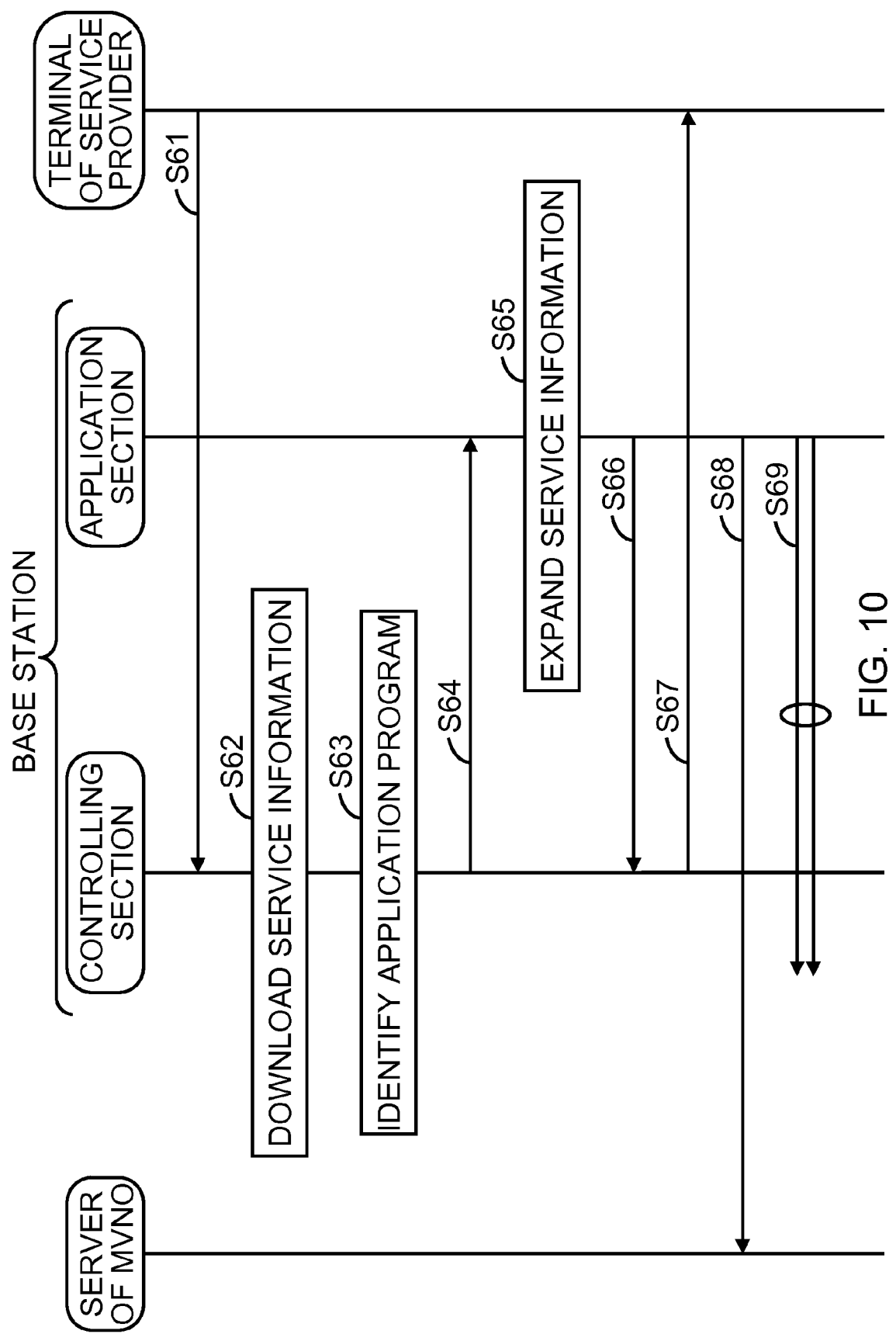
FIG. 10 is a diagram illustrating an example of a sequence of operations for registering service information according to an embodiment of the present invention.

FIG. 10 illustrates a third example of a sequence of operations for registering service information according to the present embodiment. Operations S61 to S68 in the third example are similar to operations S41 to S48 in the second example of a sequence of operations for registering service information. The difference of the third example from the second example is as follows.

In operation S69, the application section 31 of the nearest base station 11 transfers the service information to other base stations and notifies the base stations of the registration of the service information, as well as transferring the service information to the server 13 of the MVNO and notifying the server 13 of the registration of the service information in operation S68. The server 13 of the MVNO and the base stations that have received the service information register the service information.

Upon receiving a request for providing service information from a terminal of a service user, the base station 11 transmits the service information to the terminal that has transmitted the request. When an application section has autonomously determined to provide service information, the base station 11 transmits the service information to the terminal of a service user.

Figure 11:
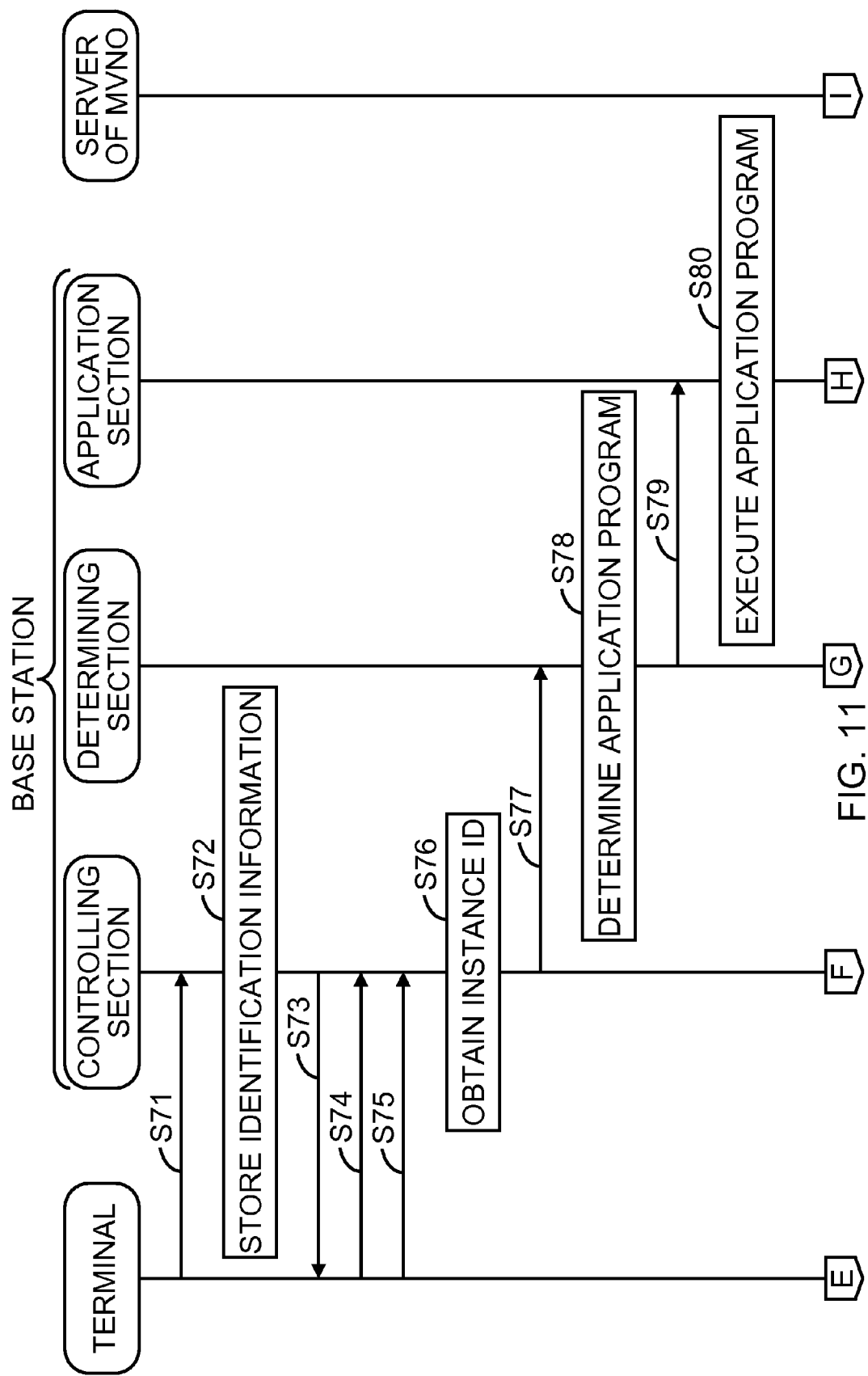
FIG. 11 is a diagram illustrating an example of a sequence of operations for determining an application program according to an embodiment of the present invention.
Figure 12:
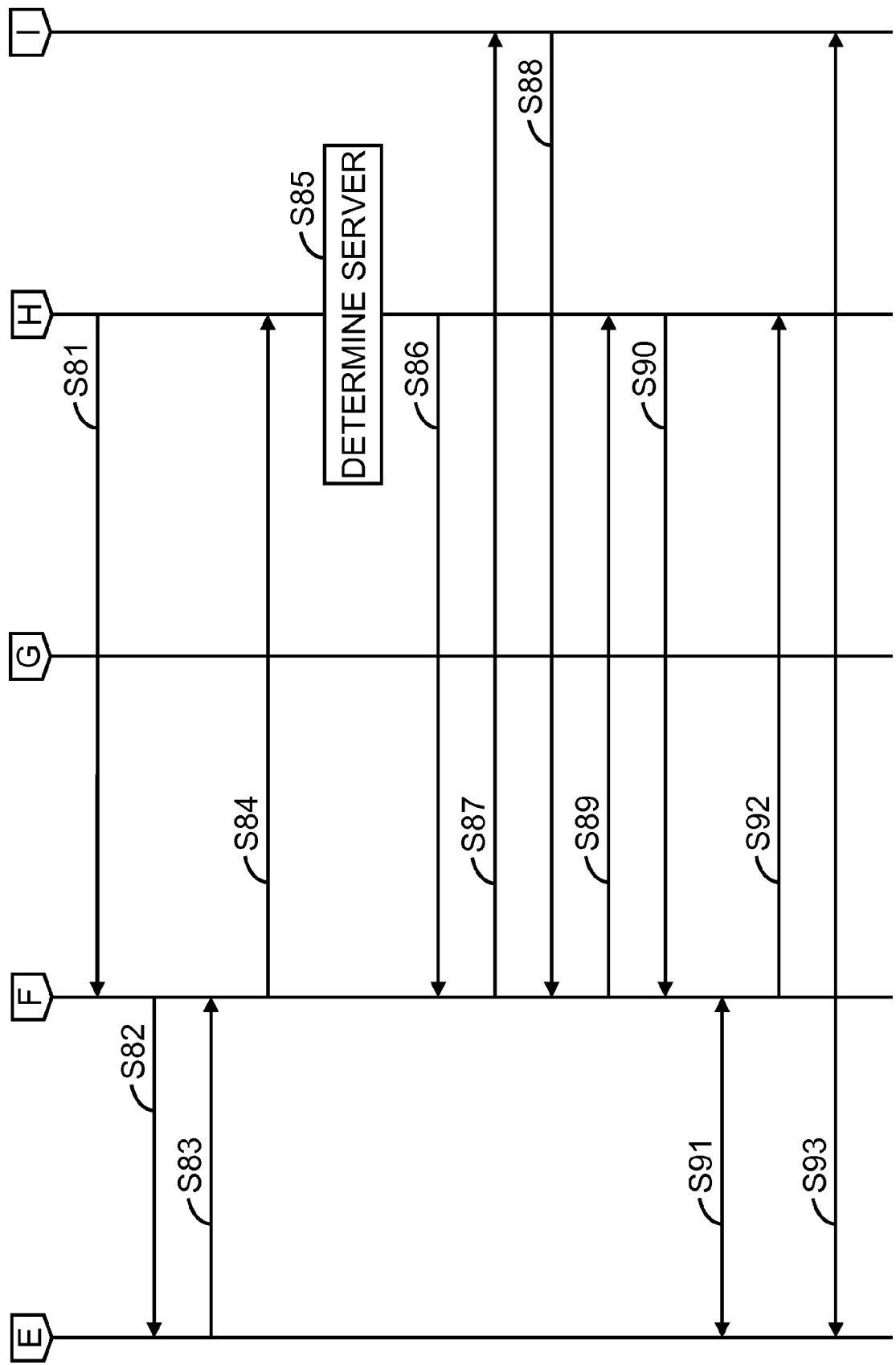
FIG. 12 is a diagram illustrating an example of a sequence of operations for determining an application program according to an embodiment of the present invention.

FIGS. 11 and 12 illustrate an example of a sequence of operations for determining an application program according to the present embodiment. Here, a discussion will be given about the case of determining the application section 31.

In operation S71, the terminal 12 of the MVNO service user requests radio resource control (RRC) connection to the base station 11 (RRC connection request). A signal for requesting RRC connection includes identification information, such as the type of terminal, the ID of an operator, or the number of an application service.

In operation S72, the controlling section 35 of the base station 11 extracts the identification information from the signal for requesting RRC connection and stores the identification information.

In operation S73, the controlling section 35 requests setup of RRC connection to the terminal 12 of the MVNO service user (RRC connection setup).

In operation S74, the terminal 12 of the MVNO service user sets RRC connection and notifies the controlling section 35 that the setup of RRC connection has been completed (RRC connection setup completion).

In operation S75, the terminal 12 of the MVNO service user requests the base station 11 to connect to a service (service request).

In operation S76, the controlling section 35 of the base station 11 obtains an instance ID from a signal for requesting connection to the service.

In operation S77, the controlling section 35 of the base station 11 requests the determining section 34 to connect to the service. The signal for requesting connection to the service transmitted to the determining section 34 includes the instance ID.

In operation S78, the determining section 34 determines whether the base station 11 has a corresponding application program in accordance with the identification information, such as the ID of the operator or the number of the application service. When the base station 11 does not hold the corresponding application program, the determining section 34 rejects the request for connection from the terminal 12 of the MVNO service user. When the base station 11 has the corresponding application program, the determining section 34 determines the corresponding application program.

In operation S79, the determining section 34 requests the application section 31, in which the corresponding application program has been registered, to connect to the service.

In operation S80, the application section 31 executes the corresponding application program to store the instance ID, determine whether to provide the service, determine a service class, extract a secret key, and the like.

In operation S81, the application section 31 requests setup for keeping a secret to the controlling section 35.

In operation S82, the controlling section 35 transmits security information to the terminal 12 of the MVNO service user (security mode command).

In operation S83, the terminal 12 of the MVNO service user sets the security information and notifies the controlling section 35 that setup of the security information has been completed (security mode completion).

In operation S84, the controlling section 35 transmits, to the application section 31, a response to the request to setup for keeping a secret.

In operation S85, the application section 31 determines the server 13 of the MVNO corresponding to the determined application program.

In operation S86, the application section 31 requests the controlling section 35 to connect to the server 13 of the MVNO.

In operation S87, the controlling section 35 requests update of wireless connection to the server 13 of the MVNO (update bearer request).

In operation S88, the server 13 of the MVNO updates wireless connection and transmits a response to the request for updating wireless connection to the controlling section 35 (update bearer response).

In operation S89, the controlling section 35 transmits, to the application section 31, a response to the request for connecting to the server 13 of the MVNO.

In operation S90, the application section 31 instructs the controlling section 35 to connect a user plane (U-Plane).

In operation S91, the wireless connection is established between the controlling section 35 and the terminal 12 of the MVNO service user.

In operation S92, the controlling section 35 transmits, to the application section 31, a response to the instruction for connecting the user plane.

In operation S93, uplink data and downlink data are transmitted/received between the terminal 12 of the MVNO service user and the server 13 of the MVNO.

The MVNO service provider may be a shopping mall, for example, and the MVNO service user may be a customer who has a contract, with the MVNO, for using an application service provided as a shopping mall service. In this case, the MVNO service provider concludes a contract with the MVNO by indicating the details of a service to the MVNO. The MVNO generates an application program for the shopping mall service. The application program for the shopping mall service is downloaded to a base station of an MNO near the shopping mall and is installed therein. The MVNO service provider supplies service information about the shopping mall, e.g., information about a bargain sale, to the MVNO, and the MVNO registers the service information to the base station in which the application program for the shopping mall service has been installed. Alternatively, the terminal of the MVNO service provider may register the service information about the shopping mall to the base station in which the application program for the shopping mall service has been installed. The base station in which the application program for the shopping mall service and the service information about the shopping mall have been registered provides the service information about the shopping mall to the terminal of the MVNO service user within a communication range thereof.

The MVNO service provider may be a provider of a service of remote monitoring and remote control of home electric appliances, for example, and the MVNO service user may be a user who has a contract, with the MVNO, for using an application service provided as the service of remote monitoring and remote control of home electric appliances. In this case, the MVNO service provider concludes a contract with the MVNO by indicating the details of a service of monitoring and controlling the appliances in a building, such as a house, office, factory, or the like, to the MVNO. The MVNO generates an application program for the service of monitoring and controlling the appliances. The application program for the service of monitoring and controlling the appliances is downloaded to a base station of the MNO in an area where the service is provided and is installed therein.

The MVNO service provider supplies information about a user who subscribes the service of monitoring and controlling appliances, e.g., information such as a media access control (MAC) address for specifying an appliance, to the MVNO, and the MVNO registers the information to the base station in which the application program for the service of monitoring and controlling appliances has been installed. Alternatively, the terminal of the MVNO service provider may register the information about a user who subscribes the service of monitoring and controlling appliances to the base station in which the application program for the service of monitoring and controlling appliances has been installed. The base station executing the application program for the service of monitoring and controlling appliances regularly collects monitoring information from an appliance that has been registered by the user who subscribes the service of monitoring and controlling appliances, and distributes the monitoring information to individual base stations. Alternatively, the base station executing the application program for the service of monitoring and controlling appliances may collect monitoring information from a registered appliance and distribute the monitoring information to individual base stations upon receiving a request from the user who subscribes the service of monitoring and controlling appliances. The user who subscribes the service of monitoring and controlling appliances monitors the appliance (e.g., whether water is in a bathtub) and controls the appliance (e.g., heat a bath) from his/her own terminal, for example. Examples of monitoring of an appliance include monitoring whether water is in a bathtub and monitoring an operation status of an air conditioner. Examples of control of an appliance include heating a bath and operating an air conditioner.

According to the second embodiment, an effect similar to that of the first embodiment may be obtained. Also, the MVNO service provider may update, from its own terminal, service information registered in a base station, whereas the MVNO service user may obtain, by using its own terminal, service information from a base station executing an application program corresponding to a service of the MVNO service provider. Thus, even when the server of the MVNO is stopped due to maintenance or occurrence of failure, the suspension of providing service information to the MVNO service user may be reduced when possible. Also, service information is provided to the MVNO service user without passing through a control apparatus of the MNO having a function of determining whether to connect to a service, and thus the transmission path for the service information may be shorter and the data communication speed may be increased. That is, delay may be reduced. Also, a response time until the MVNO service user obtains service information may be shortened. Since the control apparatus of the MNO having a function of determining whether to connect to a service is not used, the amount of information transferred within the MNO and the amount of information transferred between the MNO and the MVNO are decreased. Thus, the load of the network may be decreased. The connection between an application section executing an application program for a service provided by the MVNO service provider and the controlling section of the base station may be realized by using a simple application program interface (API). Therefore, the MVNO may generate an application program even if the MVNO does not know well the RRC protocol or the S1 application protocol (S1AP), and thus entry to the mobile virtual network business may be easily performed. The embodiment may be applied to various services, such as telephone call and data communication, other than the above-discussed two application examples.

Some or all of the operations discussed above may be implemented as a computer executable code. Such a computer executable code contains a plurality of computer instructions that when performed result in the execution of the tasks discussed herein. Such computer executable code may be available as source code or in object code, and may be further included as part of, for example, a portable memory device or downloaded from the Internet, or embodied on a program storage unit or computer readable medium. Computer executable code may also be available on a computer-readable storage medium which includes all computer-readable media except for a transitory, propagating signal.

The base station 1 or 11 may be a computer such as a personal computer (PC), a server machine, and a workstation or an electronic apparatus such a personal digital assistant (PDA).

The computer includes a processor, a main memory, a secondary memory, and an interface device, such as a communication interface, interfacing with a peripheral device. The main memory and the secondary memory are computer-readable storage media except for a transitory, propagating signal.

The processor loads a program stored in the storage medium onto a work area of the main memory, executes the program, and controls the peripheral devices by executing the program. The computer thus performs a function satisfying a specific purpose.

The processor may include a central processing unit (CPU) and a data signal processor (DSP). The main memory may include a random-access memory (RAM) and a read-only memory (ROM).

The secondary memory may include an erasable programmable ROM (EPROM) and a hard disk drive (HDD). The secondary memory may be a removable medium i.e., a portable recording medium. The removable media may include a universal serial bus (USB) memory and a disk memory such as a compact disk (CD) and a digital versatile disk (DVD).

The communication interface device may include a local-area network (LAN) interface board and a wireless communication circuit for wireless communication.

The peripheral devices may include input devices such as a keyboard and a pointing device, and output devices such as a display and a printer. The input devices may also include a video and image input device such as a camera, or an audio input device such as a microphone. The output devices may also include an audio output device, such as a loudspeaker.

The computer as the base station 1 or 11 performs the functions of the application sections 4-6 or 31-33, the determining section 7 or 34, and the controlling section 8 or 35 when the processor loads the program stored on the secondary memory to the main memory for execution.

Figure 13:
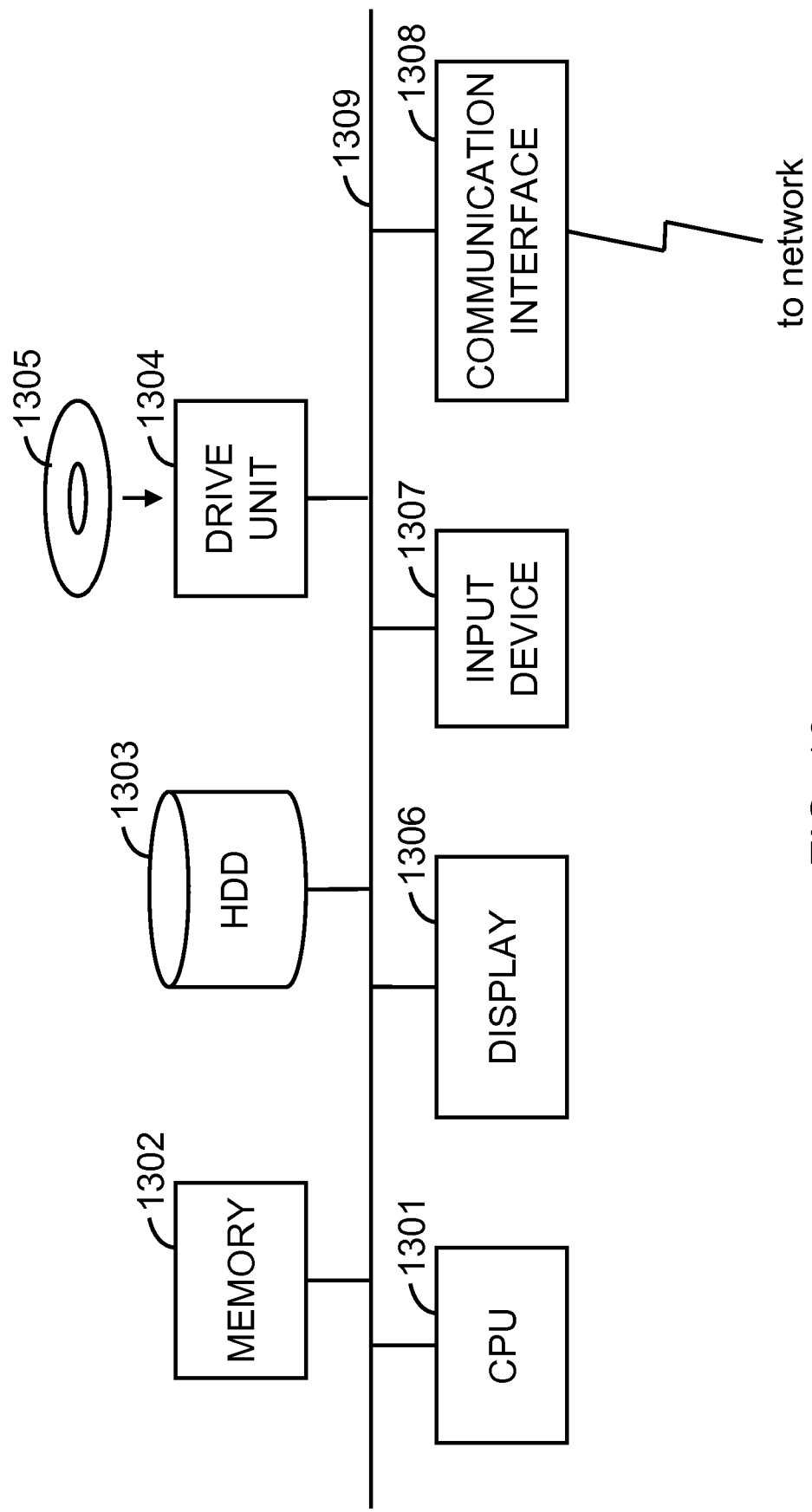
FIG. 13 is a diagram illustrating an example of a system configuration of a computer system.

FIG. 13 illustrates an example of a system configuration of a computer system. The example illustrated in FIG. 13 includes a CPU 1301, a memory 1302, an HDD 1303, a drive unit 1304 for driving a removable media 1305, a display 1306, an input device 1307, a communication interface 1308, and a bus 1309 for connecting these components.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:
1. A base station, comprising:
a memory; and
a processor, said processor executing a process to embody:
at least one first application section each configured to execute one of a plurality of first application programs corresponding to one of a plurality of first application services utilizing a first wireless communication service provided by a mobile virtual network operator;
a determining section configured to receive a connection request to connect to the first application service from a first terminal for using the first wireless communication service, and determine the first application section corresponding to the first application service specified in the connection request; and a controlling section configured to control communications between the determined first application section and a server managed by the mobile virtual network operator and between the determined first application section and the first terminal, wherein the controlling section downloads and installs a first application program from a second terminal managed by the mobile virtual network operator, and registers the installed first application program to one of the first application sections.

2. A base station, comprising:

a memory; and a processor, said processor executing a process to embody:

at least one first application section each configured to execute one of a plurality of first application programs corresponding to one of a plurality of first application services utilizing a first wireless communication service provided by a mobile virtual network operator;

a determining section configured to receive a connection request to connect to the first application service from a first terminal for using the first wireless communication service, and determine the first application section corresponding to the first application service specified in the connection request; and a controlling section configured to control communications between the determined first application section and a server managed by the mobile virtual network operator and between the determined first application section and the first terminal, wherein the controlling section downloads service information from a second terminal managed by the mobile virtual network operator, the service information being used in the first application service corresponding to a first application program, and notifies the service information to the first application section corresponding to the first application program.

3. A base station, comprising:

a memory; and a processor, said processor executing a process to embody:

at least one first application section each configured to execute one of a plurality of first application programs corresponding to one of a plurality of first application services utilizing a first wireless communication service provided by a mobile virtual network operator;

a determining section configured to receive a connection request to connect to the first application service from a first terminal for using the first wireless communication service, and determine the first application section corresponding to the first application service specified in the connection request; and a controlling section configured to control communications between the determined first application section and a server managed by the mobile virtual network operator and between the determined first application section and the first terminal, wherein the controlling section downloads service information from a second terminal configured to providing the first application service by utilizing the first wireless communication service provided by the mobile virtual network operator, the service information being used in the first application service corresponding to a first application program, and notifies the service information to the first application section corresponding to the first application program.

4. The base station according to claim 1, wherein the first application sections determine whether to connect to the first application service specified in the connection request.

5. The base station according to claim 1, wherein the determining section determines the first application section in accordance with first information for identifying the first application service, the first information being included in the connection request.

6. The base station according to claim 1, wherein the determining section determines the first application section in accordance with second information for identifying the first application section, the second information being included in the connection request.

7. The base station according to claim 1, wherein the processor further embodies:

at least one second application section each configured to execute one of a plurality of second application programs corresponding to one of a plurality of second application services utilizing a second wireless communication service provided by a mobile network operator leasing a mobile network to the mobile virtual network operator.

8. A wireless communication system, comprising:

a first terminal for using a first wireless communication service provided by a mobile virtual network operator;

a server managed by the mobile virtual network operator; and a base station including:

at least one first application section each configured to execute one of a plurality of first application programs corresponding to one of a plurality of first application services utilizing the first wireless communication service, a determining section configured to receive a connection request to connect to a first application service from the first terminal, and determine a first application section corresponding to the first application service specified in the connection request, a controlling section configured to control communications between the determined first application section and the server and between the determined first application section and the first terminal, and a second terminal managed by the mobile virtual network operator, wherein the controlling section downloads and installs a first application program from a second terminal, and registers the installed first application program to one of the first application sections.

9. A wireless communication system, comprising:

a first terminal for using a first wireless communication service provided by a mobile virtual network operator;

a server managed by the mobile virtual network operator; and a base station including:

at least one first application section each configured to execute one of a plurality of first application programs corresponding to one of a plurality of first application services utilizing the first wireless communication service, a determining section configured to receive a connection request to connect to a first application service from the first terminal, and determine a first application section corresponding to the first application service specified in the connection request, a controlling section configured to control communications between the determined first application section and the server and between the determined first application section and the first terminal, and a second terminal managed by the mobile virtual network operator, wherein the controlling section downloads service information from the second terminal, the service information being used in the first application service corresponding to a first application program, and notifies the service information to the first application section corresponding to the first application program.

10. A wireless communication system, comprising:

a first terminal for using a first wireless communication service provided by a mobile virtual network operator;

a server managed by the mobile virtual network operator; and a base station including:

at least one first application section each configured to execute one of a plurality of first application programs corresponding to one of a plurality of first application services utilizing the first wireless communication service, a determining section configured to receive a connection request to connect to a first application service from the first terminal, and determine a first application section corresponding to the first application service specified in the connection request, a controlling section configured to control communications between the determined first application section and the server and between the determined first application section and the first terminal, and a second terminal configured to providing the first application service by utilizing the first wireless communication service provided by the mobile virtual network operator; wherein the controlling section downloads service information from the second terminal, the service information being used in the first application service corresponding to a first application program, and notifies the service information to the first application section corresponding to the first application program.

11. The wireless communication system according to claim 8, wherein the first application sections determine whether to connect to the first application service specified in the connection request.

12. The wireless communication system according to claim 8, wherein the determining section determines the first application section in accordance with first information for identifying the first application service, the first information being included in the connection request.

13. The wireless communication system according to claim 8, wherein the determining section determines the first application section in accordance with second information for identifying the first application section, the second information being included in the connection request.

14. The wireless communication system according to claim 8, wherein the base station further includes at least one second application section each configured to execute one of a plurality of second application programs corresponding to one of a plurality of second application services utilizing a second wireless communication service provided by a mobile network operator leasing a mobile network to the mobile virtual network operator.

15. A wireless communication method executed by a wireless communication system, the wireless communication system including a terminal, a server, and a base station, the terminal being for using a wireless communication service provided by a mobile virtual network operator, the server being managed by the mobile virtual network operator, the base station executing one or more application programs each of which corresponding to any of a plurality of application services utilizing the wireless communication service, the wireless communication method comprising:

requesting, by the terminal, to connect to a first application service;

determining, by the base station, a first application program corresponding to the first application service specified in a connection request upon receiving the connection request from the terminal;

executing, by the base station, the determined first application program;

communicating, by the base station executing the determined first application program, with the server;

providing, by the base station executing the determined first application program, the first application service corresponding to the determined first application program to the terminal; and downloading and installing, by the base station, an application program from a second terminal managed by the mobile virtual network operator, and registering the installed application program.

* * * * *